United States Patent [19]

Bender

[11] Patent Number: 5,561,562
[45] Date of Patent: Oct. 1, 1996

[54] MICROSCOPE OBJECTIVE WITH A CORRECTING MOUNT

[75] Inventor: Reinhold Bender, Solms, Germany

[73] Assignee: Leica Mikroskopie und Systeme GmbH, Wetzlar, Germany

[21] Appl. No.: 392,997

[22] PCT Filed: Jul. 11, 1994

[86] PCT No.: PCT/DE94/00794

§ 371 Date: Mar. 7, 1995

§ 102(e) Date: Mar. 7, 1995

[87] PCT Pub. No.: WO95/02842

PCT Pub. Date: Jan. 26, 1995

[30] Foreign Application Priority Data

Jul. 15, 1993 [DE] Germany .................. 43 23 721.5

[51] Int. Cl.⁶ .................. G02B 7/02; G02B 15/14
[52] U.S. Cl. .................. 359/823; 359/694; 359/821; 359/822; 359/699
[58] Field of Search .................. 359/823, 826, 359/656, 660, 699, 700, 701, 694, 821, 822

[56] References Cited

U.S. PATENT DOCUMENTS

| | | | |
|---|---|---|---|
| 2,533,371 | 12/1950 | Heine | 88/57 |
| 4,059,342 | 11/1977 | Tojyo | 359/658 |
| 4,199,227 | 4/1980 | Uesugi | 359/701 |
| 4,208,101 | 6/1980 | Trapp | 350/175 |
| 4,372,650 | 2/1983 | Lisfeld | 359/829 |
| 4,411,498 | 10/1983 | Muryoi | 359/701 |
| 4,666,256 | 5/1987 | Shimizu | 350/414 |
| 4,856,872 | 8/1989 | Spitznas | 359/826 |
| 4,934,789 | 6/1990 | Lemke | 359/823 |
| 4,953,962 | 9/1990 | Esswein | 350/507 |
| 5,191,748 | 3/1993 | Horiguchi | 359/703 |

FOREIGN PATENT DOCUMENTS

| | | |
|---|---|---|
| 800443 | 11/1950 | Germany . |
| 1037719 | 8/1958 | Germany . |
| 3735324 | 6/1988 | Germany . |
| 3812745 | 10/1989 | Germany . |

*Primary Examiner*—Georgia Y. Epps
*Assistant Examiner*—Ricky Mack
*Attorney, Agent, or Firm*—Bean, Kauffman & Spencer

[57] ABSTRACT

A microscope objective adjustable for different cover slip thicknesses includes an outer ring rotatable about an optical axis of the objective, an intermediate mount carrier having a plurality of inner lens mounts fixed thereto, and an inner correcting lens mount axially movable between a pair of fixed lens mounts. The correcting mount is coupled to the outer ring for rotation therewith by a follower pin extending through a curved cam slot in the intermediate mount carrier and into an axial groove in the outer ring, such that when the outer ring is rotated the correcting mount moves axially due to engagement of the follower pin with the cam slot and simultaneously rotates about the optical axis due to engagement of the follower pin with the axial groove.

3 Claims, 3 Drawing Sheets

MICROSCOPE OBJECTIVE WITH A CORRECTING MOUNT

BACKGROUND OF THE INVENTION

1. Field of the Invention

The invention pertains to a microscope objective with at least one correcting mount adjustable for different cover slip thickness.

2. Description of the Prior Art

A microscope objective for the compensation of different cover slip thicknesses is known from DE 38 12 745 AL, which has four lens groups, of which the second and the fourth lens group are movable, whereby both are counter-rotated towards each other. The mount of this objective contains an outer ring, which is attached to the case, into which an additional fixed ring is screwed, which has an inner thread for a there rotatably mounted intermediate ring. This intermediate ring has a cam, which engages into the notch of an operating ring, which can be rotated around the fixed ring. The rotatable intermediate ring has two spiral grooves with opposite-running and differently steep pitches. Into these grooves engages a cam, which is attached to the mount of the fourth lens element as well as a cam, which is screwed into the mount ring of the second lens group. These cams engage furthermore through axial slits into a mount ring, as well as its surrounding carrier hull, which contains the mount ring of the front lens group as well as all other lens mounts. A cam protects the carrier hull against distortion, so that the lens elements move axially when the operating ring is rotated without rotating themselves.

Furthermore a microscope objective with a correcting mount especially for different plane-parallel plate thicknesses in the object space is known from DE 37 35 324 AL, which has only one movable front lens group for image distortion correction, whereby a focal-plane correction occurs at the same time, through axial movement of the entire optical system. For this purpose it consists of two movable lens groups, of which the front lens group is moved with an operating ring through a motion-thread axially relative to the second lens group, while both lens groups are moved in a gliding tube relative to a fixed tube with that same operating ring.

These known microscope objectives with correcting mounts share the axial movement of one or several lens groups in order to compensate different cover slip thicknesses. The moving of a correcting mount within a cylindrical mount ring in exclusively axial direction however leads to tilting of the correcting mount around the optical axis, if its height in relation to the inner diameter of the mount ring is small, i.e. smaller than 0.6 times of this diameter. In the extreme case, i.e. with large diameter mount rings and correction rings of small height jamming of the mounts may occur.

SUMMARY OF THE INVENTION

The invention faces the task to design a microscope objective with a correcting mount of the above mentioned type, in which no tiltings occur when the correcting mount is moved within the mounting ring.

This task is solved in the present invention by providing means for automatically rotating the correcting mount about the optical axis as it is being moved axially. In accordance with an embodiment of the present invention, an objective includes a plurality of mounts fixed to a mount carrier for supporting lens groups on an optical axis, and an axially movable correcting mount located between a pair of the fixed mounts for supporting a correcting lens group. A follower pin is fixed to the correcting mount and extends through a curved cam slot in the mount carrier and into an axially extending inner groove in an outer knurled ring. When the outer ring is rotated about the optical axis, the correcting mount is caused to move axially by engagement of the follower pin with the cam slot, and simultaneously caused to rotate about the optical axis by engagement of the follower pin with the axial groove. In another embodiment, an additional correcting mount is provided between a different pair of fixed mounts, and a second follower pin extends through a second curved cam slot in the mount carrier and into the axial groove in the outer ring. By combining rotational motion of each correcting mount with axial motion thereof, jamming of the correcting mount with the mount carrier during axial movement is prevented.

BRIEF DESCRIPTION OF THE DRAWING

The following description of three design types, schematically depicted in the drawings, further explains the invention. Identical parts are marked by the same reference numbers.

They show.

DETAILED DESCRIPTION OF THE PREFERRED EMBODIMENTS

Figure 1:
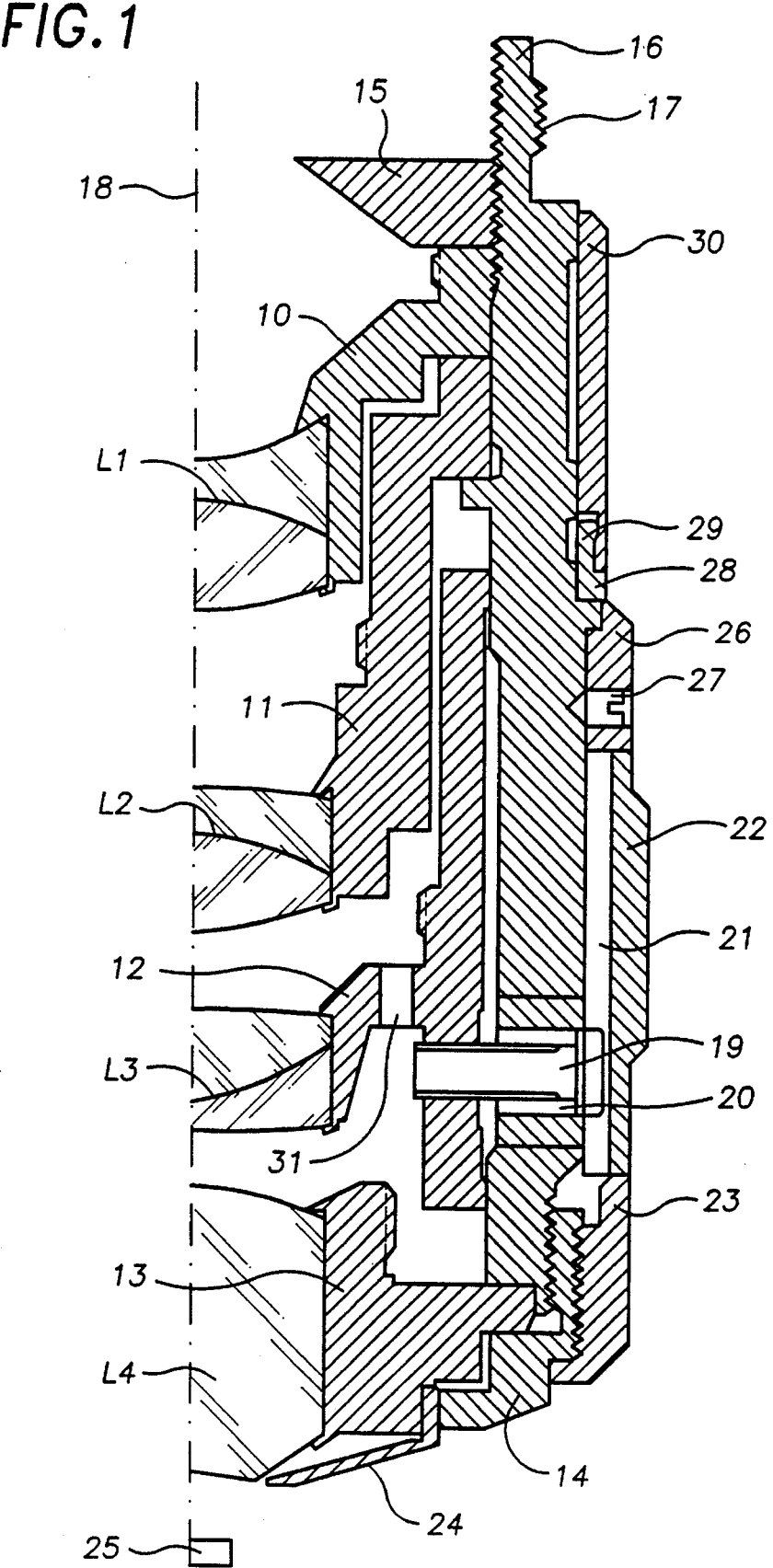
FIG. 1: a partial longitudinal section of the objective according to this invention with a correcting mount in an enlarged scale.

The objective shown in FIG. 1 has a magnification of 20×, has a numerical aperture of 0.40 and contains four lens groups L1–L4, which are attached in mounts 10, 11, 12, 13. Mounts 10, 11 and 13 are connected through two rings 14 and 15 with a cylindrical mount carrier 16, which has a screw thread 17 for the attachment of the objective. The correcting lens group L3 is held by a correcting mount 12, into which a follower pin 19 is screwed perpendicular to the optical axis 18. The pin 19 lies with its middle section in a curved cam slot 20 of the mount carrier 16 and engages with its other end into an inner groove 21 of a knurled outer ring 22, which is parallel to the optical axis 18. The knurled ring is held in axial direction by a closing ring 23, which is screwed on to ring 14. 24 refers to a cap, which protects the front lens. The knurled ring 22 not only moves the correcting mount 12 but also serves for the attachment and detachment of the objective to a not depicted turret. An adjusting ring 26 is used to adjust the knurled ring 22 to a certain thickness of cover slip 25. It is attached with a screw 27 to the mount carrier 16. An identifying ring 28 for the chosen enlargement is located above the adjustment ring 26. A hull 30, containing the identifying data of the objective is attached through a snap-on connection 29 to the identifying ring 28.

When the knurled ring 22 is operated the pin 19 runs onto the curved cam slot 20 of the mount carrier 16 and moves the correcting mount 12 together with the correcting lens group L3 in axial direction. At the same time both are rotated around the optical axis 18 because of the engagement of the pin 19 into the inner groove 21 of the knurled ring 22. The correcting mount 12 is thus moved extremely evenly and without jamming within the mount carrier 16. A drilling 31 in the correcting mount 12 allows air to permeate during its moving process. The above described objective enables a correction of the cover slip thickness of 0–2 mm.

Figure 2:
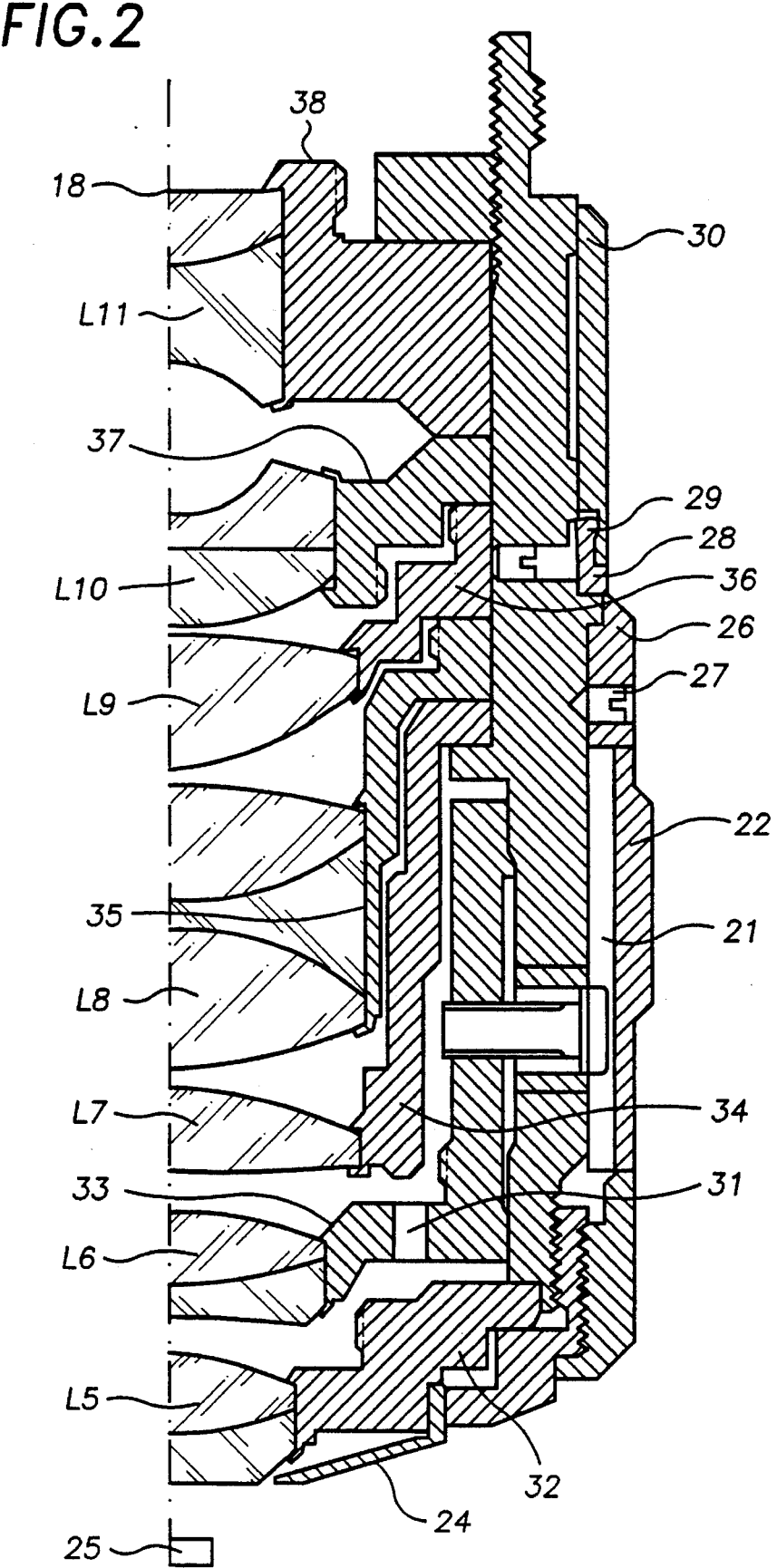
FIG. 2: a partial longitudinal section of a further design type with a correcting mount

The objective in FIG. 2 has a magnification of 63×, has a numerical aperture of 0.70 and contains seven lens groups L5–L11 in their respective mounts 32–38. This objective enables cover slip corrections of 0.1–1.3 mm. The comparison to the objective in FIG. 1 shows that the parts 21, 22, 26, 27, 28, 29 and 30 are identical, which reduces the manufacturing costs. In this objective the correcting mount 33 with the correcting lens group L6 can be moved axially and rotated around the optical axis 18 simultaneously through the knurled ring 22. The rendition of further characteristics is not necessary because its function is the same as the objective in FIG. 1.

Figure 3:
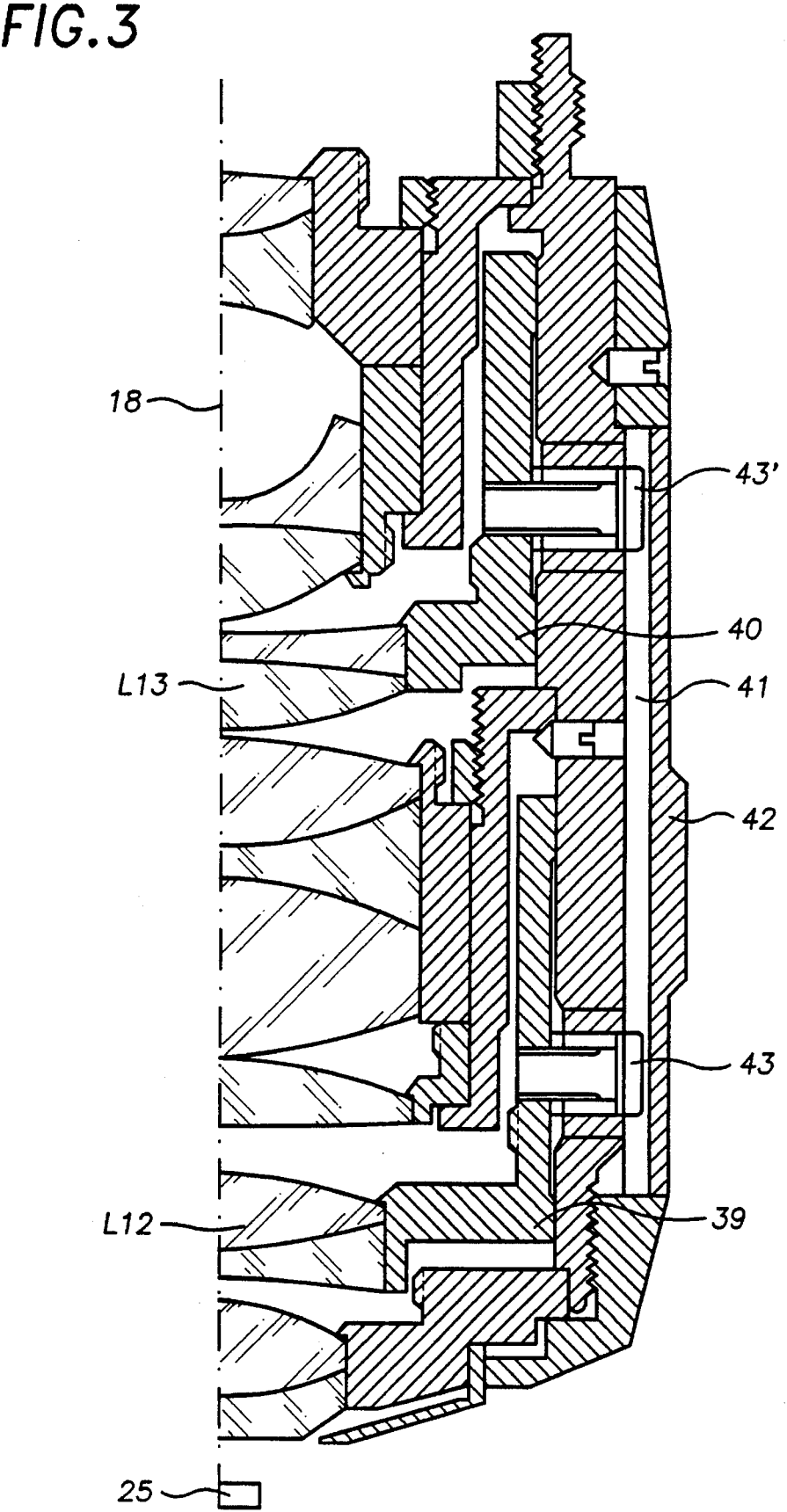
FIG. 3: a partial longitudinal section of another design type with two correcting mounts.

The design type of an objective depicted in FIG. 3 has two correcting mounts 39,40, which carry correcting lens groups L12, L13 respectively. Their axial mount is combined again with a rotation around the optical axis 18. For this two pins 43,43', which are screwed on the correcting mount 39,40, engage into the groove 41 of the knurled ring 42.

The microscope objectives according to this invention are furthermore characterized by a comparatively favorable relation of the diameter to the height. Because of this slender construction, they are especially suitable for microscopes with limited space-conditions due to their design, like, e.g. in reversed microscopes.

What is claimed is:

1. A microscope objective comprising:

a central optical axis;

an outer ring rotatable about said axis and having an inwardly opening axially extending groove;

an intermediate annular mount carrier having a plurality of axially spaced inner mounts fixed thereto for supporting a plurality of lens groups on said axis and a curved cam slot through a wall of said mount carrier; and an inner correcting mount between a pair of said plurality of fixed mounts for supporting a correcting lens group on said axis, said correcting mount being coupled to said outer ring for rotation therewith by a follower pin fixed to said correcting mount and arranged for engagement with said cam slot and said axial groove;

whereby rotational motion of said correcting mount is provided in combination with axial motion thereof incident to rotation of said outer ring to prevent jamming of said correcting mount against said mount carrier.

2. The microscope objective according to claim 1, further including a second correcting mount between a different pair of said plurality of fixed mounts for supporting a second correcting lens group on said axis, a second curved cam slot through said mount carrier, and a second follower pin fixed to said second correcting mount and arranged for engagement with said second cam slot and said axial groove.

3. In a microscope objective having an optical axis and a plurality of lens groups aligned on said axis, the improvement comprising:

an annular mount carrier having a curved cam slot through an inner wall thereof;

a plurality of inner mounts fixed to said inner wall of said mount carrier for supporting said plurality of lens groups in a fixed axially spaced relationship on said axis;

an inner correcting mount enclosed within said mount carrier between a pair of said fixed mounts for movably supporting a correcting lens group on said axis, and a follower pin fixed to said correcting mount and engaging said cam slot for moving said correcting mount in opposite axial directions in response to relative rotation between said mount carrier and said correcting mount about said axis; and means for rotating said correcting mount about said axis while said correcting mount is being moved in an axial direction, wherein said means for rotating said correcting mount comprises an outer ring rotatable about said axis and having an axially extending groove, and said follower pin is arranged to engage said groove.

* * * * *